Figure 1:
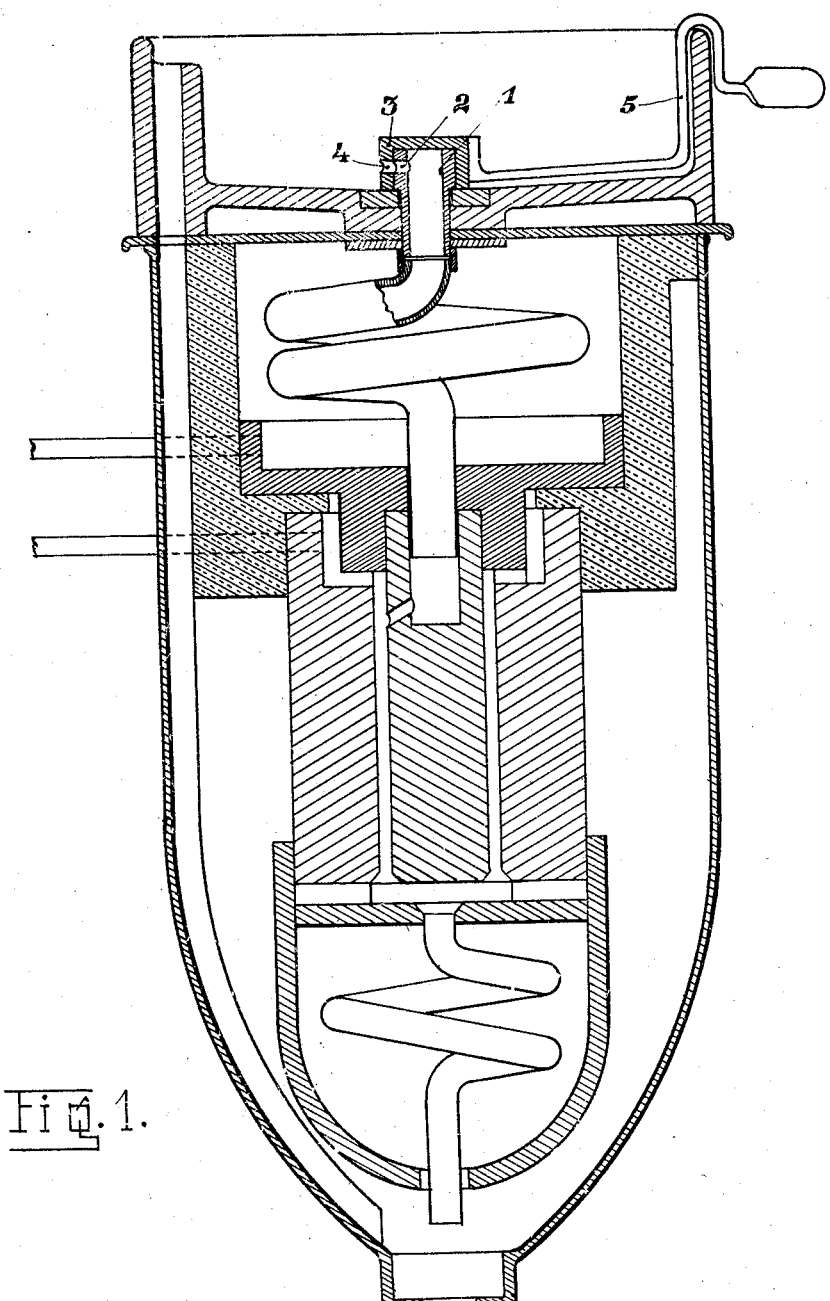

Jan. 13, 1931. O. GRAETZER 1,788,669
ELECTRICAL WATER HEATING APPARATUS HAVING ELECTRODES
Filed June 21, 1928 2 Sheets-Sheet 2

INVENTOR
Otto Graetzer
by
Attorney.

Patented Jan. 13, 1931

1,788,669

UNITED STATES PATENT OFFICE

OTTO GRAETZER, OF ZURICH-ZOLLIKON, SWITZERLAND

ELECTRICAL WATER-HEATING APPARATUS HAVING ELECTRODES

Application filed June 21, 1928, Serial No. 287,222, and in Switzerland July 8, 1927.

With electrical water heating apparatus of the "geyser" type and having electrodes between which the water to be heated flows, which apparatus are not directly screwed on to the water supply outlet, it has not been hitherto possible to regulate the apparatus for a definite current consumption and temperature of the outflowing water, because the apparatus is affected by the temperature and electrical conductivity of the cold water supplied to it.

As regards its electrical conductivity, water exhibits great differences, which depend also on the fact that the temperature of the water changes with the time of the year.

The consequence of this is that, for example, an apparatus which has been designed for a current consumption of 6 amperes at the factory takes 10 amperes at another place and only four amperes at a third. If the apparatus takes 10 amperes instead of 6 the fuses blow if the electric conductors are protected with 6 ampere fuses. If 10 ampere fuses are used for protection a great part of the water is wasted in steam owing to the current consumption of the apparatus being too great, with the result that fluctuations in current occur and uniform outflow of the water is prevented.

If on the contrary the current consumption is for example only 4 amperes the water flowing through the apparatus cannot take up sufficient heat and therefore has a lower temperature than at the place where the apparatus was manufactured, so that the apparatus does not then fulfill expectations.

Owing to these variable results many electricity works prohibit the connection of these apparatus to their mains.

It has been found by exact experiment and observation that the aforesaid drawbacks can only be avoided, if the spaces between the electrodes are filled to a greater or less extent with water and the amount of the water supply can be suitably regulated by means of a valve according to the conductivity and temperature of the water.

With all geysers the attempt is made to obtain the most rapid heating possible of the water. With electrode apparatus of the kind stated however the space between the electrodes must first be filled with water before the heating of the latter can begin.

In the apparatus which forms the subject matter of the present invention it is possible to effect the immediate heating of the water by first opening the regulating device to its fullest extent, whereby the electrodes are immediately filled with water. Then as soon as the water is heated the regulator is so adjusted that the flow of the water to the electrodes is only in a quantity such that it is suitable to the conditions prevailing at the time. In order that the inlet opening of the regulating device cannot be left open permanently, whereby the flow of water through the apparatus would be too great and the consumption of current also would be too great, the regulating device can be so constructed that, after being temporarily fully opened, the water inlets are automatically reduced in size and the device is simultaneously fixed in the pre-determined position in which the water supply corresponds to the prevailing conditions.

An embodiment of the invention is illustrated by way of example in the accompanying drawings, in which Fig. 1 is a longitudinal section through a water-heating apparatus having electrodes.

Figure 2:
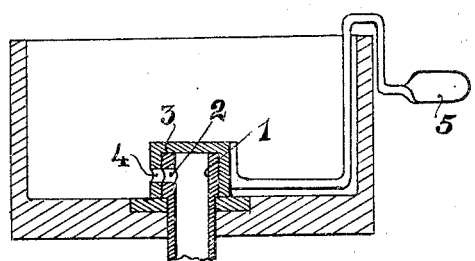
Figure 3:
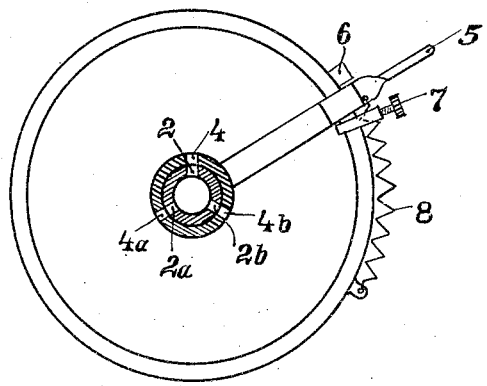
Figures 4, 5:
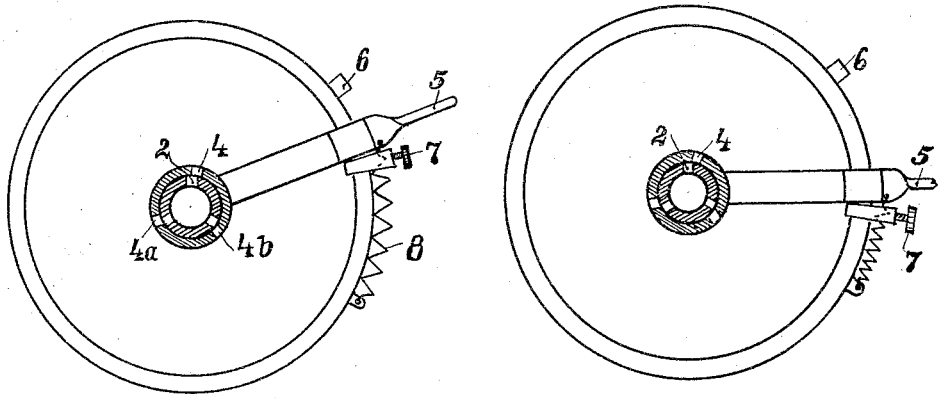

Fig. 2 is a section through the regulating device itself, and Figs. 3, 4 and 5 are plans of the regulating device in different positions.

Referring to the drawing, the water supply pipe 1 has three lateral passages 2, 2a and 2b, the diameter of which is such that the water flowing through them can completely fill the space between the electrodes. In order now to be able to regulate the supply of water to the electrodes and to fill the space between them with water to a greater or smaller height, there is fitted over the supply pipe 1 a revoluble cap 3 which has three passages 4, 4a and 4b of the same size as the passages 2, 2a and 2b in the supply pipe. A lever arm 5 is fixed to the cap 3. If this lever arm is turned until it abuts against the stop 6, the passages 2, 2a and 2b in the supply pipe and the passages 4, 4a and 4b in the cap are directly opposite one another (Fig. 3). In this position the amount of water which is necessary to completely fill the space between the electrodes with water flows through. If in this position of the lever arm the current consumption is as desired without fluctuations in current occurring, the lever arm 5 is locked in this position by means of the catch 7. In most cases the current consumption will be too great in this position, because the electrodes are made so large that they are able to heat very cold and badly conducting water. If a better conducting water is available, as is generally the case, the lever arm is turned to the right (Fig. 4) until the ammeter indicates the current prescribed for the apparatus. By turning the lever arm to the right the water supply inlets are reduced in size by the cap 3, and therefore the space between the electrodes is filled more slowly and to a smaller extent with water. In order to lock the lever arm in this position, the catch 7 is inserted behind it. Fig. 5 shows a position in which the size of the water inlets is still further reduced.

In order to allow a greater quantity of water to reach the electrodes quickly at the moment when the apparatus is first used, the lever arm 5 is turned as far as the stop 6, held in this position for a few seconds and then released when it is automatically released back to the catch 7, which forms a stop, by the spring 8.

By means of this invention not only is it possible to regulate the apparatus at any place according to the condition of the water supply so as to take a definite number of amperes without fluctuations in current occurring, but also, if the temperature of the water varies, as in summer time and winter, to maintain the outflowing hot water at a definite temperature by adjusting the stop or catch 7 to the right or left.

The invention also enables the water to be heated more quickly and, when provided with the hereinbefore described automatic return of the valve, provides security against unsuitable treatment.

I claim

1. An electric water heater having electrodes, a water supply pipe for conducting water to said electrodes, a plurality of passages in the upper end of said water supply pipe, a cap rotatably mounted on and enclosing the end of said water supply pipe, a second plurality of passages in said cap capable of coinciding with said first plurality of passages and means for varying the coincidence of said passages to maintain the conductance of the water supply constant.

2. An electric water heater having electrodes, a water supply pipe for conducting water to said electrodes, a plurality of passages in the upper end of said water supply pipe, a cap rotatably mounted on and enclosing the end of said water supply pipe, a second plurality of passages in said cap capable of coinciding with said first plurality of passages and means for adjustably varying the coincidence of said passages to maintain the conductance of the water supply constant comprising a lever arm integral with said cap and adjustably engaging a corrugated spring.

OTTO GRAETZER.